(No Model.)
G. W. TALLMAN.
BICYCLE.
No. 576,331. Patented Feb. 2, 1897.
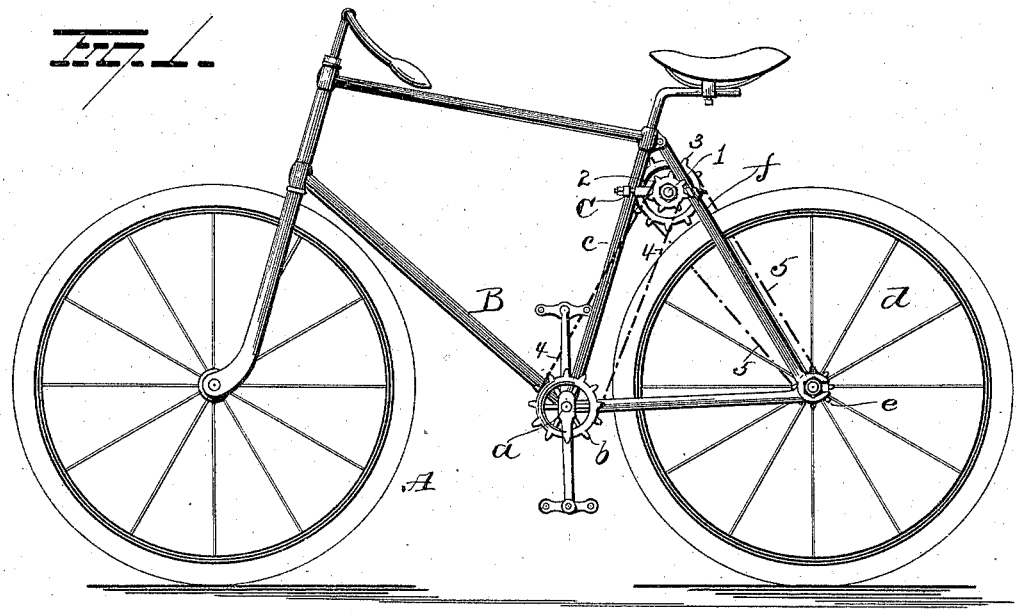
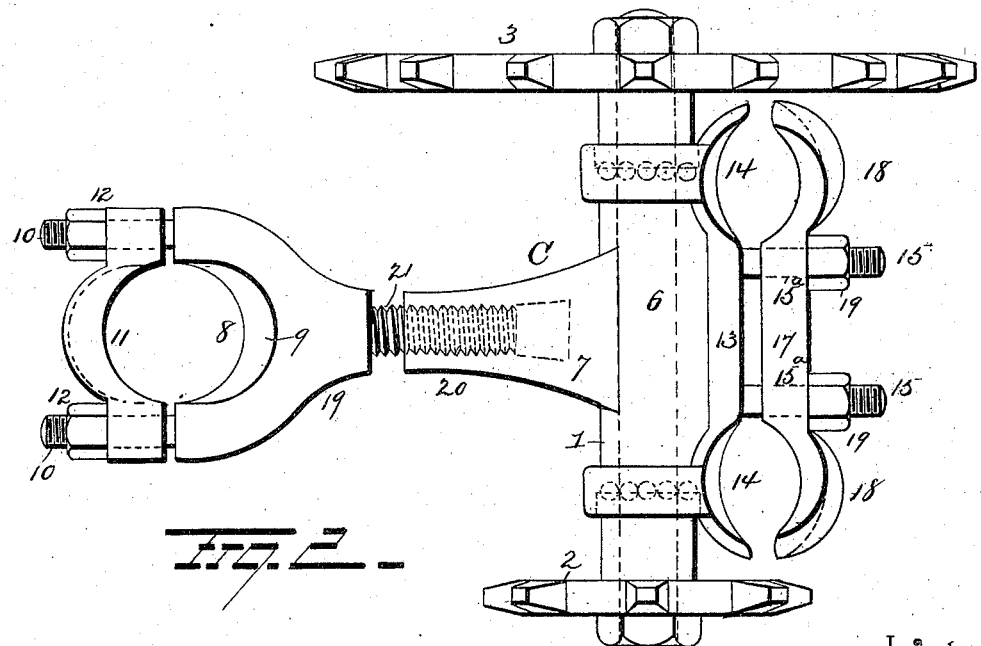
Witnesses
E. J. Nottingham
S. W. Foster
Inventor
Geo. W. Tallman
By H. A. Seymour
Attorney

UNITED STATES PATENT OFFICE.

GEORGE W. TALLMAN, OF NEW YORK, N. Y.

BICYCLE.

SPECIFICATION forming part of Letters Patent No. 576,331, dated February 2, 1897.

Application filed August 14, 1895. Serial No. 559,237. (No model.)

*To all whom it may concern:*

Be it known that I, GEORGE W. TALLMAN, a resident of New York, in the county of New York and State of New York, have invented certain new and useful Improvements in Bicycles; and I do hereby declare the following to be a full, clear, and exact description of the invention, such as will enable others skilled in the art to which it appertains to make and use the same.

My invention relates to an improvement in bicycles, and more particularly to propelling mechanism therefor, the object of the invention being to provide an ordinary diamond-frame bicycle with simple and efficient means whereby the speed of the machine can be increased with the expenditure of a minimum amount of power.

A further object is to produce simple devices for supporting supplemental gearing for a bicycle, which devices shall be so constructed that they can be easily and quickly applied to or removed from any diamond frame.

A further object is to provide a bracket for supporting supplemental gearing for a bicycle which can be firmly fixed to a diamond frame between the central brace or seat-post and the rear arms of the backbone thereof, which shall be simple in construction and cheap to manufacture, and which shall be effectual in all respects in the performance of its functions.

With these objects in view the invention consists in certain novel features of construction and combinations and arrangements of parts, as hereinafter set forth, and pointed out in the claims.

In the accompanying drawings, Figure 1 is a view of a bicycle having my improvements applied thereto. Fig. 2 is an enlarged detail view representing my improvements.

A represents a bicycle having the ordinary diamond frame B and having the crank or pedal shaft $a$ with the sprocket-wheel $b$ mounted at the base of the brace or seat-post $c$ of the frame. The rear wheel $d$ of the machine is provided with the usual small sprocket-wheel $e$.

Between the brace or seat-post $c$ (at or near the upper end thereof) and the rear arms $f$ of the backbone of the frame my improved supporting-bracket C is located and adapted for the reception of a counter-shaft 1, on the respective ends of which sprocket-wheels 2 3 are secured, the wheel 3 being considerably larger than the wheel 2. A sprocket-chain 4 passes over the sprocket-wheels $b$ and 2, whereby to transmit motion from the crank or pedal shaft to the counter-shaft. Motion is transmitted from the counter-shaft 1 to the rear wheel of the machine by means of a sprocket-chain 5, passing over the sprocket-wheels $e$ and 3. From this construction and arrangement of gearing it will be seen that by the employment of the counter-shaft and gearing thereon the speed of the rear wheel will be materially increased without increasing the amount of power necessary to drive it.

My improved bracket C comprises a sleeve 6 for the accommodation of the counter-shaft 1, from which sleeve an arm 7 projects laterally and at its free end is bifurcated, as at 8, for the accommodation of the brace or seat-post $c$ of the frame, the seat or bearing of the arm against said post or brace being beveled, as at 9.

The bifurcated or forked end of the arm 7 is made with two screw-threaded stems 10 10, which project forwardly at respective sides of the seat-post or brace $c$ and pass through a clip 11, having a beveled inner face to bear against the post or brace $c$. On the free ends of the stems 10 suitable nuts 12 are screwed, and the bracket C is thus securely but removably fastened to the seat-post or brace $c$ of the frame. Opposite the arm 7 the sleeve 6 is made with an integral flange or enlargement 13, having beveled recesses 14 therein at its respective ends for the reception of the diagonal rear bars $f$ of the frame. From the flange or enlargement 13 (preferably between the recesses 14) screw-threaded stems 15 15 project rearwardly between the bars or arms $f$ of the frame and through perforations $15^a$ between the ends of a clip 17. The clip 17 is made at its respective ends with beveled lips or jaws 18, adapted to engage the arms or bars $f$. Thus it will be seen that when suitable nuts 19 are screwed upon the stems 15 the bracket will be securely but removably attached to the rear bars $f$ of the frame.

In order to provide ready means whereby to tighten or slacken the sprocket-chains 4 5, the arm of the bracket C is made extensible, being in two parts 19 20 adjustably connected together, the part 19 having a screw-threaded stem 21 to enter a threaded socket 22 in the part 20. By lengthening or shortening the arm 7 the bracket can be moved up or down and the chains 4 5 thus tightened or slackened.

My improved bracket can be easily and quickly secured to any diamond frame and can be readily removed therefrom when it is desired to dispense with the supplemental gearing.

Having fully described my invention, what I claim as new, and desire to secure by Letters Patent, is—

1. In a bicycle, the combination with a seat-post, and rear arms, said parts inclining and converging toward each other at their upper ends in the usual manner, of an extensible bracket located in the space between the seat-post and these arms, and clips removably secured to the bracket outside of the post and arms for retaining the bracket in place, an axle journaled in the bracket and carrying sprocket-wheels and chains extending from these wheels to one on the pedal-shaft and one on the rear axle, substantially as set forth.

2. In a bicycle, the combination with the frame, the crank-shaft and the rear wheel, of an extensible bracket disposed between and secured to the seat-post or central brace and the rear bars of the frame, a clamp for securing the bracket in place, a counter-shaft mounted in said bracket, and gearing between said counter-shaft and the crank-shaft and rear wheel, substantially as set forth.

3. A bracket for supporting the counter-shaft of supplemental gearing for a bicycle, consisting of a sleeve to receive said counter-shaft, a flange or enlargement on said sleeve adapted to be secured to the rear bars of the frame, and an arm projecting from the sleeve and adapted to be secured to the seat-post or central brace of the frame, said arm being made in two parts adjustably connected together, substantially as set forth.

In testimony whereof I have signed this specification in the presence of two subscribing witnesses.

GEORGE W. TALLMAN.

Witnesses:
  R. S. FERGUSON,
  C. S. DRURY.